United States Patent
Hatano et al.

(10) Patent No.: US 7,562,575 B2
(45) Date of Patent: Jul. 21, 2009

(54) IMPACT-RESISTANT ACCELERATION SENSOR

(75) Inventors: Hiroyuki Hatano, Mohka (JP); Yoshiaki Takada, Mohka (JP); Masakatsu Saitoh, Yokohama (JP)

(73) Assignee: Hitachi Metals, Ltd., Tokyo (JP)

(*) Notice: Subject to any disclaimer, the term of this patent is extended or adjusted under 35 U.S.C. 154(b) by 566 days.

(21) Appl. No.: 11/481,003

(22) Filed: Jul. 6, 2006

(65) Prior Publication Data

US 2007/0028687 A1 Feb. 8, 2007

(30) Foreign Application Priority Data

Aug. 5, 2005 (JP) ............... 2005-228025
Jan. 19, 2006 (JP) ............... 2006-000318

(51) Int. Cl.
*G01P 3/00* (2006.01)
(52) U.S. Cl. ............... 73/526; 73/514.01; 73/514.09; 73/514.24; 73/514.38
(58) Field of Classification Search ............... 73/514.01, 73/493, 514.09, 514.24, 514.38, 526
See application file for complete search history.

(56) References Cited

U.S. PATENT DOCUMENTS

| | | | |
|---|---|---|---|
| 6,892,578 B2 * | 5/2005 | Saitoh et al. | 73/514.33 |
| 6,892,579 B2 * | 5/2005 | Ohtoyo et al. | 73/514.33 |
| 6,955,086 B2 * | 10/2005 | Yoshikawa et al. | 73/514.32 |
| 7,331,230 B2 * | 2/2008 | Takeyari et al. | 73/514.33 |
| 2004/0226373 A1 * | 11/2004 | Sakaguchi | 73/514.16 |
| 2005/0056093 A1 * | 3/2005 | Hatano et al. | 73/488 |
| 2005/0097958 A1 * | 5/2005 | Ikegami | 73/514.16 |
| 2007/0234804 A1 * | 10/2007 | Tamura et al. | 73/526 |

FOREIGN PATENT DOCUMENTS

| | | |
|---|---|---|
| JP | 04-274005 | 9/1992 |
| JP | 05-041148 | 2/1993 |
| JP | 08-233851 | 9/1996 |
| JP | 2000187041 A * | 7/2000 |
| JP | 2005140720 A * | 6/2005 |

* cited by examiner

*Primary Examiner*—Hezron Williams
*Assistant Examiner*—Samir M Shah
(74) *Attorney, Agent, or Firm*—Sughrue Mion, PLLC

(57) ABSTRACT

An acceleration sensor, which has realized such a high impact-resistance that a weight bottom surface of an acceleration sensor element does not directly collide with an inner bottom plate of a protection case made of ceramic, glass or silicon to avoid edges and corners of the weight bottom surface of the acceleration sensor element chipping, even when an excessive acceleration or impact is applied to the acceleration sensor. The acceleration sensor comprises the acceleration sensor element having in a center a weight that works as a pendulum when acceleration is applied, and the protection case housing the acceleration sensor element. The inner bottom plate of the protection case works as a regulation plate to prevent the weight from excessively swing downwards. An impact buffer material of a metal layer or a resin layer is provided on the weight bottom surface or the inner bottom plate of the protection case.

11 Claims, 6 Drawing Sheets

IMPACT-RESISTANT ACCELERATION SENSOR

BACKGROUND OF THE INVENTION

1. Field of the Invention

The present invention relates to an acceleration sensor for detecting acceleration, which is used for toys, automobiles, aircrafts, portable terminals and the like, and particularly to an acceleration sensor superior in impact-resistance.

2. Description of the Related Art

Acceleration sensor elements for use in the acceleration sensor, utilizing a change in physical quantity such as a piezo resistance effect and a change in electrostatic capacity, have been developed and commercialized. These acceleration sensor elements can be widely used in various fields, but recently, such small-sized acceleration sensors as can detect acceleration in multi-axial directions at one time with high sensitivity are demanded.

Since silicon single crystal is an ideal elastic body due to the extreme paucity of lattice defect and since a semiconductor process technology can be applied without large modification, much attention is paid to a piezo resistance effect type semiconductor acceleration sensor element in which thin elastic arms are provided at a silicon single crystal substrate, and the stress applied to the thin elastic arms is converted into an electric signal by strain gauges, for example, piezo-resistors, to be an output.

As a three-axis acceleration sensor element, an acceleration sensor element has been used, which comprises elastic arms each of a beam structure formed by a thin portion of a silicon single crystal substrate connecting a weight constituted by a thick portion of a silicon single crystal substrate in a center and a support frame in its periphery. A plurality of strain gauges are formed in each axial direction on the elastic arms. In order to sense a small acceleration with an enhanced sensitivity, the elastic arms are made long and/or thin, or the weight that works as a pendulum is made heavy. The acceleration sensor element that can detect a small acceleration has led to an excessive amplitude of the weight, when subjected to a large impact, and resulted to break the elastic arms. To avoid the break of the elastic arms even if a massive impact is applied, regulation plates have been installed above and below the acceleration sensor element to restrict amplitude of the weight within a certain range. The acceleration sensor element is housed in a protection case made of aluminum oxide or the like, and a bottom surface of a support frame of the acceleration sensor element is fixed to an inner bottom of the protection case with adhesive. Part of the inner bottom of the protection case facing a weight bottom of the acceleration sensor element usually works as a regulation plate on a bottom side.

Japanese Laid-Open Patents HEI 4-274005 (JP 04-274005 A), HEI 5-41148 (JP 05-41148 A) and HEI 8-233851 (JP 08-233851 A) disclose a structure in which, to control a gap at a predetermined value between regulation plates and a weight of acceleration sensor elements, small balls having a diameter of substantially the same distance as the gap are mixed into adhesive, and the adhesive mixed with small balls is used to bond the regulation plates to the acceleration sensor element. The gap can be maintained at a predetermined value because the gap between the regulation plates and the acceleration sensor element can be dictated by a diameter of small balls. The use of adhesive containing small balls thus enables the control of a gap between the regulation plates and the acceleration sensor element.

An upper regulation plate mounted on a weight and an inner bottom plate of a protection case used as a lower regulation plate can restrict movement of the weight within an appropriate range and avoid a damage of elastic arms. Among a number of acceleration sensors, however, a problem that ridges or corners of weight bottom surfaces made of silicon are chipped happens at a certain low frequency. When broken chips are held in gaps between weight top surfaces and the upper regulation plates or between the weight bottom surfaces and the inner bottom plates of the protection cases, normal movement of the weights are prevented, and acceleration to be measured cannot be measured in accuracy.

When a large acceleration component in a horizontal plane of an acceleration sensor element is applied to an acceleration sensor, a weight of the acceleration sensor element is largely swung in the acceleration direction, and edges of the weight bottom surface collide with an inner bottom plate of a protection case with a big impact. By the impact, the edges or corners of the weight bottom surface of the acceleration sensor may chip. When an acceleration sensor is freely dropped from a few meters high and collides with a wood on a floor or a ground, an impact caused by the collision is at least 4000 G to 5000 G. When such a large impact is applied to the acceleration sensor weight, edges or corners of the weight bottom surface may chip.

There may be an idea that edges and corners of weight bottom surfaces are chamfered or rounded to avoid the edges and corners of the weight bottom surfaces chipping even when the edges and corners of the weight bottom surfaces collide with the inner bottom plates of the protection cases and are applied a large impact. But, chamfering or rounding the edges or corners of the weight bottom surfaces is hard to machine and not practical. Alternatively, it may be thought that the protection cases are made of a soft metal or plastics, which may absorb an impact caused by the collision of the weights with the inner bottom plates of the protection cases. Metal and plastics have large thermal expansion coefficient that is much different from that of silicon of the acceleration sensor elements. The large difference in the thermal expansion coefficient may cause elastic arms to bend due to environmental temperature change and lead to offset in sensor output and noise. To decrease the offset in sensor output and the noise, the protection cases are made of ceramic or glass that has almost the same thermal expansion coefficient as silicon, of which the acceleration sensor element is made, or made of silicon like the acceleration sensor element.

SUMMARY OF THE INVENTION

The present invention has been accomplished to resolve the aforementioned problems and provides an acceleration sensor, in which a protection case made of ceramic, glass or silicon is used, that has realized such a high impact-resistance that chipping of edges or corners of a weight bottom surface of an acceleration sensor element is avoided.

An acceleration sensor of the present invention comprises:
an acceleration sensor element having
  a weight located in a center of the acceleration sensor element,
  a support frame surrounding the weight and being at a predetermined distance from the weight,
  a plurality of elastic arms bridging an upper portion of the weight and an upper portion of the support frame and hanging the weight, and
  strain gauges formed on the elastic arms;

a first regulation plate mounted on the acceleration sensor element with a first predetermined gap with a top surface of the weight; and a protection case, which inner bottom plate is fixed to a bottom surface of the support frame of the acceleration sensor element and has a gap between a weight bottom surface and a part of the inner bottom plate of the protection case facing the weight bottom surface;

wherein an impact buffer material is fixed to at least one of the weight bottom surface and the part of the inner bottom plate of the protection case facing the weight bottom surface, and the other of the weight bottom surface and the part of the inner bottom plate of the protection case facing the weight bottom surface forms a second predetermined gap with the impact buffer material. The protection case may be made of a hard material, such as ceramic, glass and silicon, as usual.

In the acceleration sensor of the present invention, an impact buffer material may be fixed to each of the weight bottom surface and the part of the inner bottom plate of the protection case facing the weight bottom surface. In the case, the predetermined gap is formed between the impact buffer material provided on the weight bottom surface and that provided on the part of the inner bottom plate of the protection case facing the weight bottom surface. It is preferable, however, that the impact buffer material is fixed to only one of the weight bottom surface and the part of the inner bottom plate of the protection case facing the weight bottom surface.

In the acceleration sensor of the present invention, it is desirable that each of the first and the second predetermined gaps is 5 to 20 μm.

It is preferable that the impact buffer material used in the acceleration sensor of the present invention is a metal layer of aluminum, copper, silver, gold or an alloy containing one of them as a main component, or a resin layer of fluorocarbon-series polymer, polyolefin-series resin, rubber-series material, fluoro-elastomer, fluoro-polymer or epoxy-series resin, and has a thickness of 1.0 μm or more. The metal layer is preferably formed by sputtering, vapor-deposition or plating, and has a thickness of 10 μm or less. The resin layer formed by painting preferably has a thickness of 200 μm or less. A metal layer formed by a bonded metal foil or a resin layer formed by a bonded plastic sheet is preferably 300 μm or less in thickness. By using, for an impact buffer material, aluminum, copper, silver or gold that is used for electrodes and lead wires of acceleration sensor elements, the impact buffer material can be formed without increasing material kinds of sputtering targets.

In the acceleration sensor of the present invention, when the impact buffer material is fixed to the weight bottom surface, it is preferable that edges of the impact buffer material are within 20 μm from an edge (ridge) of the weight bottom surface.

When an excessive acceleration is applied to an acceleration sensor in vertical direction, a weight of the acceleration sensor moves up or down, and a bottom surface of the weight collides with an inner bottom plate of a protection case. When the weight bottom surface collides with the inner bottom plate of the protection case, an impact buffer material provided on the weight bottom surface collides with the inner bottom plate of the protection case to avoid a direct impact applied to the weight. When an excessive horizontal acceleration is applied to the acceleration sensor, the weight of the acceleration sensor swings like a pendulum, and an edge of the weight bottom surface collides with the inner bottom plate of the protection case. Since the impact buffer material is provided on the weight bottom surface so that edges of the impact buffer material is within 20 μm from edges of the weight bottom surface, the edges of the impact buffer material collides with the inner bottom plate of the protection case and prevents edges of the weight bottom surface colliding with the inner bottom plate of the protection case, when the weight swings and an edge of the weight bottom surface collides with the inner bottom plate of the protection case.

Presuming that the weight bottom surface is at a distance of 5 to 20 μm from the inner bottom plate of the protection case and that the weight dimension is 1000 μm in a side length, the maximum tilting angle of a weight without an impact buffer material is $\sin^{-1}(20/500)=2.292$ degrees, when the weight swings until an edge of the weight contacts an inner bottom plate of the protection case. In a case that an impact buffer material of 1 μm thick is formed on a weight bottom surface and its edge is 20 μm inside from the edge of the weight bottom surface, the maximum tilting angle of the weight is $\sin^{-1}((19/480)=2.269$ degrees, when the weight swings until an edge of the weight contacts an inner bottom plate of the protection case. Since the tilting angle for the weight with the impact buffer material formed on the weight bottom surface is restricted within 2.269 degrees, edges of the weight bottom surface do not directly collide with the inner bottom plate of the protection case.

The acceleration sensor, in which the impact buffer material is fixed to the weight bottom surface, has been described above, but an acceleration sensor having an impact buffer material fixed to, instead of the weight bottom surface, a part of an inner bottom plate of a protection case facing a weight bottom surface works in the same manner as the above case.

In a case that an impact buffer material is fixed to a weight bottom surface in an acceleration sensor of the present invention, edges of the impact buffer material fixed to the weight bottom surface may be at a distance of 1 μm or more and 20 μm or less from edges of the weight bottom surface.

An impact buffer material of a metal layer is formed on the weight bottom surface by sputtering, vapor-deposition or plating. Since a shape of the impact buffer material is fit to a shape of the weight bottom surface with masking, it is preferable that the impact buffer material is formed with its edges having clearance of 1 μm or more inside from the edges of the weight bottom surface.

In a case that an impact buffer material is fixed to a weight bottom surface in an acceleration sensor of the present invention, the impact buffer material may be formed to meet the shape of the weight bottom surface, fitting edges of the impact buffer material to edges of the weight bottom surface. Alternatively, the impact buffer material may be formed to cover the whole weight bottom surface and extend around edges of the weight bottom surface and to side surfaces of the weight.

In a case that an impact buffer material is fixed to a part of the inner bottom plate of the protection case facing the weight bottom surface in an acceleration sensor of the present invention, the impact buffer material works when the impact buffer material is provided only on the part of the inner bottom plate of the protection case to cover the part. Alternatively, the impact buffer material may be formed so that edges of the impact buffer material are 20 μm or less inside from edges of the part of the inner bottom plate of the protection case facing the weight bottom surface.

In a case that an impact buffer material is fixed to a part of the inner bottom plate of the protection case facing the weight bottom surface in an acceleration sensor of the present invention, the impact buffer material may cover the part of the inner bottom plate of the protection case facing the weight bottom surface and be fixed to a region broader than the part. If the region covered by the impact buffer material extends to a part of the inner bottom plate of the protection case fixed to a bottom surface of the support frame, it is preferable that the impact buffer material is less than 5 μm in thickness. The impact buffer material is made of a metal layer or a resin layer, while the acceleration sensor element is made of single crystal silicon. The thermal expansion coefficient (14 to 24×10$^{-6}$ deg.$^{-1}$) of the metal layer and the resin layer is about 3.5 to 6.2 times that of silicon single crystal. When the impact buffer material is less than 5 μm in thickness, a temperature change does not cause a large stress in elastic arms due to difference in thermal expansion coefficient between the impact buffer material and the acceleration sensor element, the elastic arms made of silicon single crystal are not deformed, and offset voltage can be maintained constant.

DETAILED DESCRIPTION OF THE PREFERRED EMBODIMENTS

EXAMPLE 1

Figure 1:
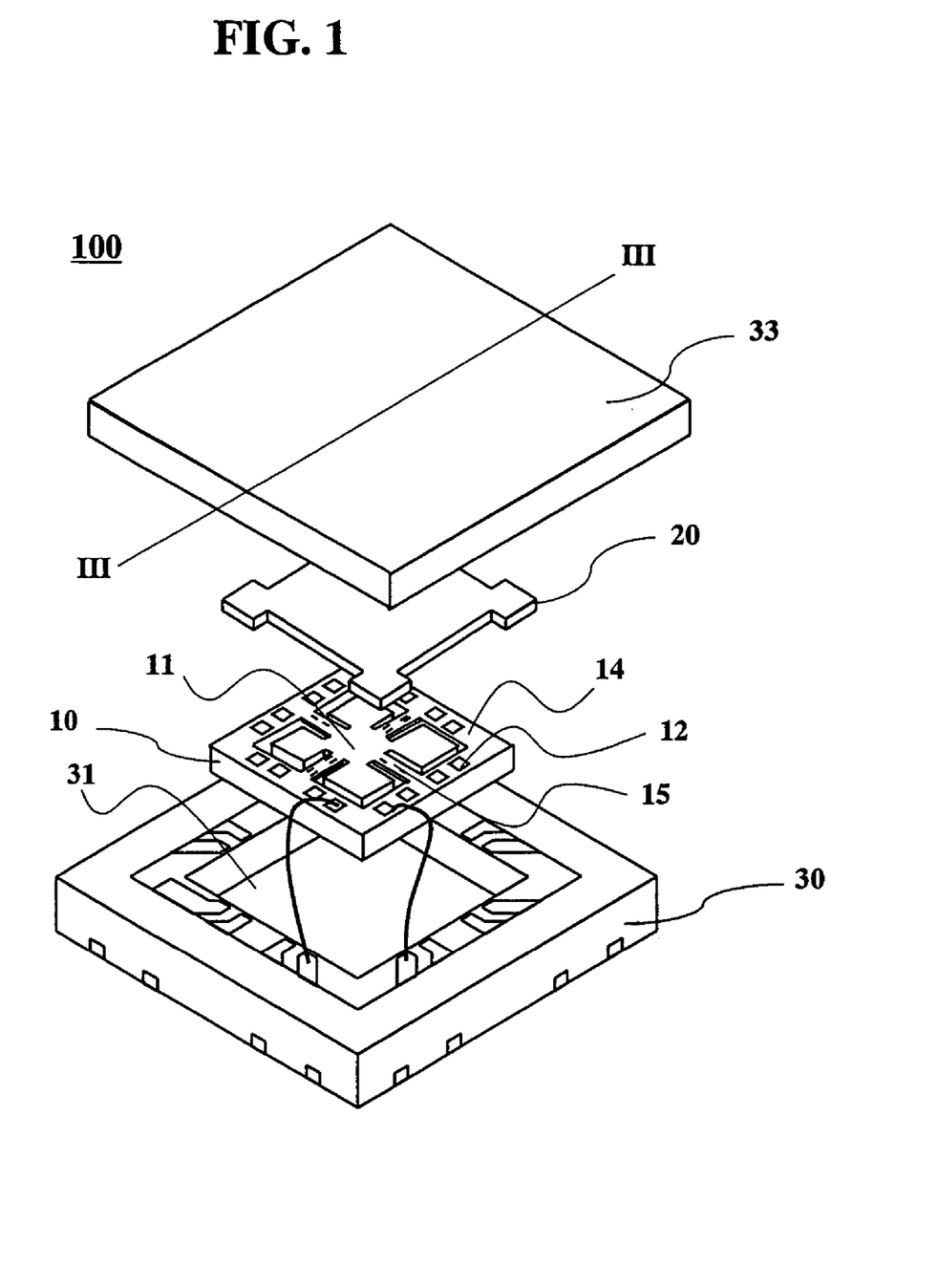
FIG. 1 is an exploded perspective view of an acceleration sensor of the present invention.
Figure 2:
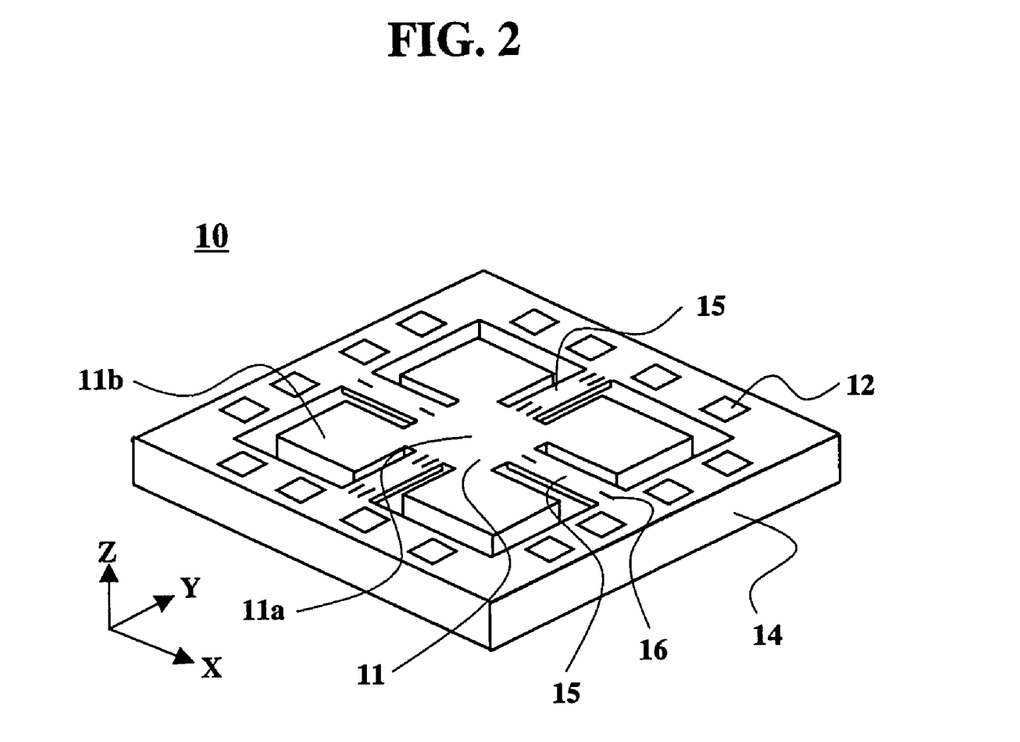
FIG. 2 is a perspective view of an acceleration sensor element used for the acceleration sensor of the present invention.
Figure 3:
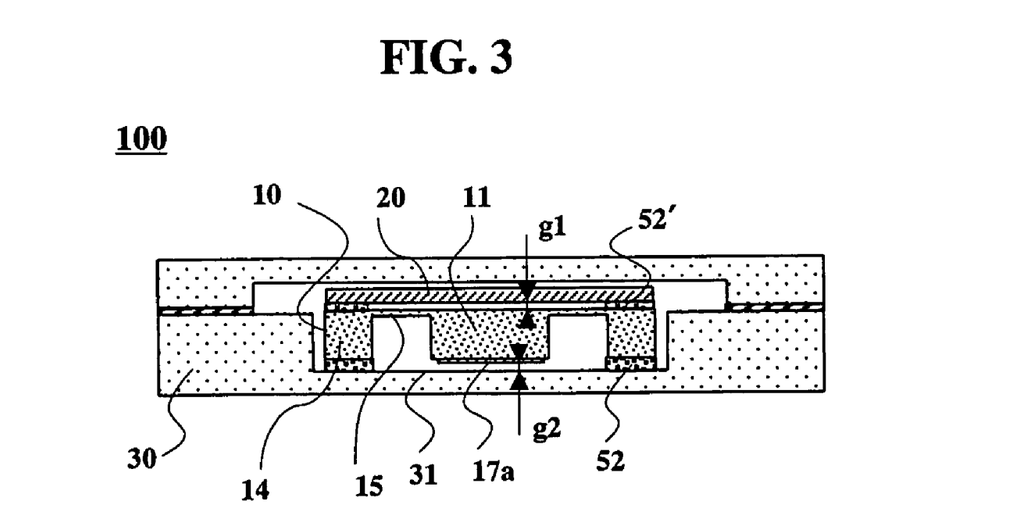
FIG. 3 is a sectional view taken along the line III-III in FIG. 1.
Figure 4:
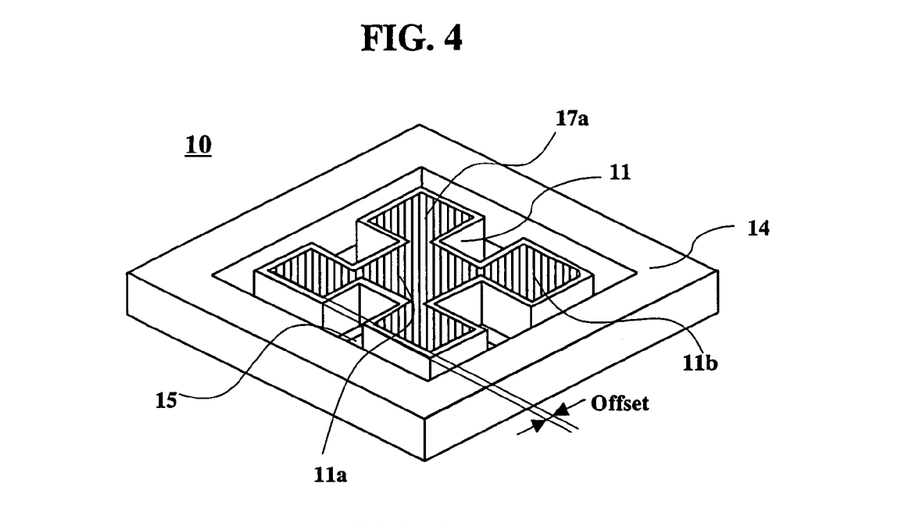
FIG. 4 is a perspective view of the acceleration sensor element shown in FIG. 2, observed from the bottom.

An embodiment of an acceleration sensor of the present invention will be explained, referring to FIGS. 1 to 4. FIG. 1 shows an exploded perspective view of the acceleration sensor of the present invention, FIG. 2 shows a perspective view showing an acceleration sensor element used in the acceleration sensor of the present invention, and FIG. 3 shows a sectional view taken along the line III-III in FIG. 1. FIG. 4 is a perspective view of the acceleration sensor element shown in FIG. 2, observed from the bottom. In the acceleration sensor 100 of the present invention, a regulation plate 20 made of a soda lime glass of 0.3 mm thick is bonded onto a top surface of the acceleration sensor element 10 by using adhesive 52' mixed with hard plastic balls (10 μm in diameter), and the acceleration sensor element 10 is inserted into and bonded to a protection case 30 made of ceramic, such as aluminum oxide. As shown in FIG. 4, on a bottom surface of a weight 11 of the acceleration sensor element, an aluminum metal layer of 1.8 μm thick is formed as an impact buffer material 17a. When a support frame 14 of the acceleration sensor element 10 is bonded on an inner bottom plate of the protection case 30, adhesive 52 mixed with hard plastic balls is previously coated onto a bonding region on the inner bottom plate 31 of the protection case. The adhesive 52 is prepared by mixing the hard plastic balls each having a diameter of 12 μm in a silicon resin by about 10 wt. %. A gap g1 between the regulation plate 20 and the acceleration sensor element 10, and a gap g2 between the inner bottom plate 31 in the protection case and the impact buffer material 17a provided on the weight bottom surface of the acceleration sensor element 10 are precisely maintained to be 10 μm and 10.2 μm, respectively, by the hard plastic balls.

The acceleration sensor element 10 for the present invention uses a silicon single crystal substrate with an SOI layer being formed via a SiO$_2$ insulation layer, namely, an SOI wafer, in order to make it possible to control the thickness of elastic arms 15 with high precision. The SOI is an abbreviation of Silicon On Insulator. In this EXAMPLE, a wafer formed by thinly forming the SiO$_2$ insulation layer being an etching stopper (about 1 μm) on a Si wafer with thickness of about 625 μm, on which an N-type silicon single crystal layer with thickness of about 6 μm is formed, is used as a substrate. The acceleration sensor element 10 is constituted by a weight 11 in a center, which is constituted by a thick portion of the silicon single crystal substrate; a square-shaped support frame 14 placed around the weight 11 to surround it; two pairs of beam-shaped elastic arms 15 that are constituted by thin portions of the silicon single crystal substrate to connect the weight 11 and the support frame 14, strain gauges (in the following explanation, "piezo-resistors" as an example of the strain gauges are used, and therefore they are called "piezo-resistors") 16, four of which are for each axis, and which are placed on the elastic arms correspondingly to two detection axes (X- and Y-axes) perpendicular to each other and the detection axis (Z-axis) orthogonal to the top surface of the acceleration sensor element. Namely, the two piezo-resistors 16 are provided on each of the elastic arms 15, which extend in the X-axis direction to detect the acceleration in the X-axis direction. The two piezo-resistors 16 are provided on each of the elastic arms 15, which extend in the Y-axis direction to detect the acceleration in the Y-axis direction. Further two piezo-resistors 16 are provided on each of the elastic arms 15, which extend in the Y-axis direction to detect the acceleration in the Z-axis direction. In the EXAMPLE, the acceleration in the Z-axis direction is detected by the piezo-resistors provided on the elastic arms 15 extending in the Y-axis direction, but the elements for detecting the acceleration in the Z-axis direction may be provided on the elastic arms 15 extending in the X-axis direction. Four of the piezo-resistors for detecting the acceleration in each axis direction construct a full bridge detection circuit. The piezo-resistors are formed by patterning the surface (the silicon layer of 6 μm thick) of the SOI wafer with a photo-resist and by bombarding the silicon layer with boron atoms of 1 to 3×10$^{19}$ atoms/cm$^3$ in density. Circuits for the piezo-resistors are formed on the wafer by metal-sputtering, dry-etching and the like.

A plurality of input/output terminals 12 for piezo-resistors are provided on the top surface of the support frame 14 of the acceleration sensor element 10. The input/output terminals 12 are connected to terminals of twelve piezo-resistors on the elastic arms by each of conductors provided from the top surfaces of the elastic arms to the top surface of the support frame. The drawings do not show these conductors that connect the input/output terminals 12 to the piezo-resistors 16.

A protection case 30 has a side frame and an inner bottom plate 31, and a bottom surface of the support frame of the acceleration sensor element 10 is fixedly bonded onto the inner bottom plate 31. When the acceleration sensor element 10 is fixed to the inner bottom plate 31, the weight 11 in the center of the acceleration sensor element 10 is not contacted with the bottom plate 31 of the protection case 30 and maintains a gap, which may be different in length from the gap g1 between the top surface of the weight and the upper regulation plate. The inner bottom plate 31 maintains a predetermined gap g2 from the impact buffer material 17a provided on the bottom surface of the weight 11 and restricts the downward vibration of the weight 11 within the predetermined gap g2, acting as a lower regulation plate. When the gap between the weight 11 and the inner bottom plate 31 is 12 μm, and a thickness of the impact buffer material 17a is 1.8 μm, the predetermined gap g2 between the impact buffer material 17a of the weight bottom surface and the inner bottom plate 31 becomes 10.2 μm.

The impact buffer material 17a made of an aluminum layer is disposed so as to have its edges retracted from edges of the bottom surface of the weight 11, as shown in FIG. 4. In the EXAMPLE, the edges of the impact buffer material 17a are 5.7 μm offset from the edges of the weight bottom surface. Although the impact buffer material edges are 5.7 μm offset from the edges of the weight bottom surface, when a large acceleration is applied to the weight 11 to swing the weight 11 and clash an edge of the weight with the inner bottom plate of the protection case, the edges of the impact buffer material of an aluminum layer collide with the inner bottom plate of the protection case to prevent the weight bottom surface edges colliding with the inner bottom plate of the protection case, because the thickness of the impact buffer material is 1.8 μm.

With respect to dimensions of the acceleration sensor element of the EXAMPLE, inside distance of the support frame 14 is 2400 μm, the elastic arms 15 are 700 μm long×80 μm wide×6 μm thick, and the weight 11 is 1800 μm×1800 μm×632 μm thick. And, the weight 11 is composed of a central weight 11a and auxiliary weights 11b provided at each of the four corners of the central weight. The central weight 11a is 1000 μm×1000 μm, and each auxiliary weight 11b is 600 μm×600 μm. Each auxiliary weight 11b overlaps a part having an area of 200 μm×200 μm of the central weight 11a at each corner of the central weight 11a. A distance from a center of the weight 11 to an outer side of the auxiliary weight 11b is 900 μm, and a distance from the center of the weight to each outer corner of the auxiliary weight 11b is 1273 μm. A distance from the center of the weight 11 to an edge of the impact buffer material 17a is 894 μm, and a distance from the center of the weight 11 to an outer corner of the impact buffer material 17a disposed on a bottom surface of the auxiliary weight is 1264 μm.

When the weight 11 tilts until an edge of the impact buffer material 17a contacts with the inner bottom plate 31 of the protection case, the tilting angle of the weight is $\sin^{-1}(10.2/894)$ =0.653 degrees. And, when the outer corner of the impact buffer material 17a contacts with the inner bottom plate 31 of the protection case, the tilting angle of the weight is $\sin^{-1}(10.2/1264)$=0.4613 degrees. For a side edge of the weight 11 to contact with the inner bottom plate 31 of the protection case, it is necessary that the weight 11 tilts at $\sin^{-1}(12/900)$=0.764 degrees, while it is necessary that the weight 11 tilts at $\sin^{-1}(12/1264)$=0.5440 degrees for an outer corner of the auxiliary weight 11b to contact with the inner bottom plate 31 of the protection case. So, it is understood that, when the weight largely swings, the edge or the corner of the impact buffer material contacts with the inner bottom plate of the protection case and prevents the edges of the weight bottom surface and the outer corners of the weight from clashing with the inner bottom plate of the protection case.

Even if the impact buffer material formed on the weight bottom surface is a little apart from the edges of the weight bottom surface as in the EXAMPLE, the edges or corners of the impact buffer material contacts with the inner bottom plate of the protection case to prevent the edges and the outer corners of the weight bottom surface from directly clashing with the inner bottom plate of the protection case when the weight swings to largely tilt. When the impact buffer material made of an aluminum layer is formed on the weight bottom surface, an aluminum layer is preliminarily formed on a back surface of an SOI wafer before forming a recess between the weight and the support frame, and the impact buffer material having a shape to be formed is made by patterning the aluminum layer. Then, a photo-resist layer is formed on a portion of the SOI wafer where the weight and the support frame are to be formed by dry etching to form grooves between the weight and the support frame. By a process reason of manufacturing the impact buffer material, there may be a case that the impact buffer material is not completely identical in dimensions to the weight bottom surface. In the present invention, even if the edges of the impact buffer material are at a certain distance, preferably at most 20 μm, from the edges of the weight bottom surface, the direct clash of the weight bottom surface to the inner bottom plate of the protection case can be avoided, as explained above.

Comparison of Impact Tests of Acceleration Sensors of the Present Invention With Comparative Acceleration Sensors 2000 acceleration sensors explained in the above EXAMPLE were manufactured and tested about how impact buffer materials of an aluminum layer of them work. For a comparison, 2000 comparative acceleration sensors were built, which did not have an impact buffer material on a weight bottom surface and in which a gap between the weight bottom surface and an inner bottom plate of a protection case was adjusted to 10.2 μm. During applying a predetermined acceleration to the 2000 acceleration sensors of the present invention and the 2000 comparative acceleration sensors, an output V0 was measured. Then, they were freely dropped on a wooden plate of 10 cm thick from 1 meter high in a manner that a horizontal acceleration was applied to them so that an impact was applied to them. The impact applied to them on their freely dropping was 4000 G to 5000 G. After the impact was applied repeatedly 20 times to them, an acceleration sensor output V1 was measured when the same magnitude of acceleration as the previously applied acceleration was applied to them. Acceleration sensors, in which the difference between the initial output V0 and the output V1 after the repeated impacts was 20% or more, were named "acceleration sensors suspicious of chipping". The acceleration sensors suspicious of chipping were disassembled and inspected about chipping. Acceleration sensors, in which chipping was found, were graded to "acceleration sensors of chipping occurrence". Chipping occurrence ratio due to the impacts applied was calculated with a formula: number of acceleration sensors of chipping occurrence/(number of impact-tested acceleration sensors×20)×100%.

A chipping occurrence ratio for the comparative acceleration sensors without impact buffer material was 0.036% in the impact tests. In comparison, a chipping occurrence ratio for the acceleration sensors of the EXAMPLE of the present invention was 0%. In the comparative acceleration sensors taken apart, the inspection of the weights showed that chips of about 20 μm happened at sides (ridges) or corners of weight bottom surfaces. By contrast, the acceleration sensors of the present invention was 0% in chipping occurrence ratio, and it was proved that the impact buffer materials formed on the weight bottom surfaces were effective to protect the weight bottom surfaces.

EXAMPLE 2

Figure 5:
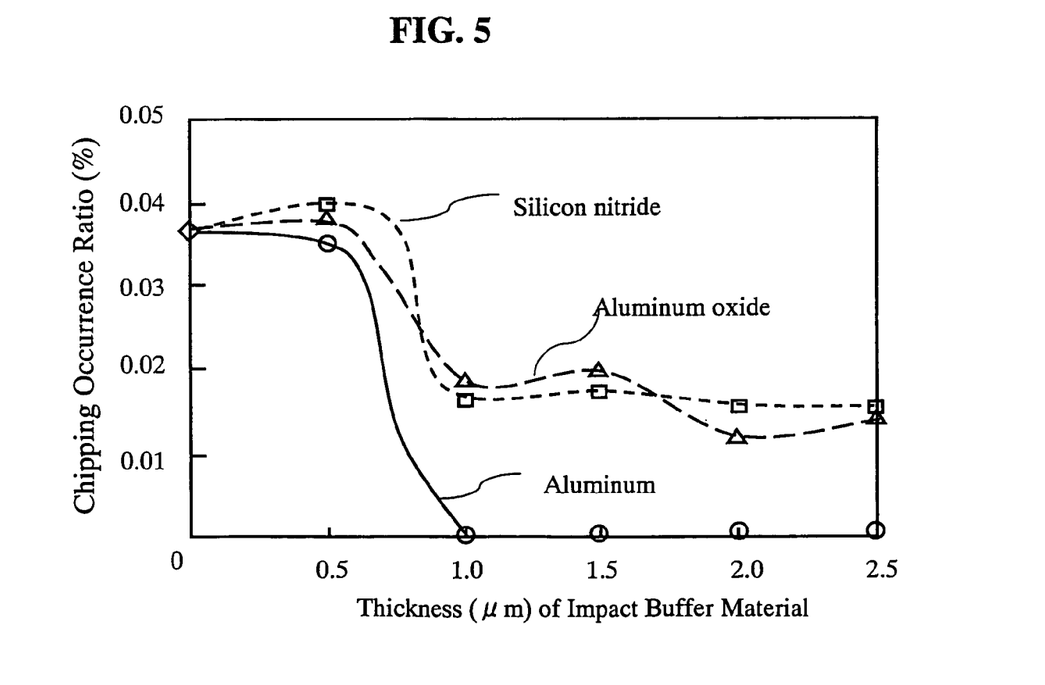
FIG. 5 is a graph showing a relationship of chipping occurrence ratio (%) vs. thickness (μm) of impact buffer material with respect to acceleration sensors when thickness of the impact buffer materials is changed from 0 μm to 2.5 μm.

The results of the study about relationship of materials and thickness of impact buffer materials with chipping occurrence ratios of their weights are shown in FIG. 5. Acceleration sensors used here had the same structure as that in EXAMPLE 1. Edges of the impact buffer materials 17a were 0.5 μm offset from edges of the bottom surfaces of the weight 11. The impact buffer materials were formed by sputtering, changing material to aluminum, copper, gold, aluminum oxide and silicon nitride and thickness of them from 0.5 μm to 2.5 μm with an interval of 0.5 μm. 2500 to 2800 acceleration sensors having each combination of material and thickness of the impact buffer material were manufactured and tested in the same way as the impact tests explained in EXAMPLE 1, and the chipping occurrence ratios of them were investigated. The 0 μm thickness in the impact buffer materials corresponds to a conventional acceleration sensor. A number of samples were tested because chipping occurrence ratio of weight bottom surfaces is very low.

The chipping occurrence ratio for the conventional acceleration sensors without impact buffer material was 0.036%. Among acceleration sensors, in which each of aluminum, copper and gold was used for the impact buffer materials of 0.5 μm thick, chipping occurred in 18 pieces for each. Since the numbers of the acceleration sensors having impact buffer materials of each of aluminum, copper and gold were 2550, 2500 and 2700, respectively, the chipping occurrence ratios were from 0.033% to 0.036%. Acceleration sensors having impact buffer materials of 1.0 μm or more in thickness were of chipping occurrence ratio of 0%. FIG. 5 shows a case of aluminum as a representative. Chipping occurrence ratios are much different between 0.5 μm and 1.0 μm. It is thought that a metal layer of 0.5 μm thick did not work well as an impact buffer material because edges or corners of weight bottom surfaces directly clashed with inner bottom plates of protection cases. This was supposed because the chipping occurrence ratio was on a level with that for the conventional acceleration sensors without impact buffer materials. It was recognized that the chipping prevention effect of metal impact buffer material starts at about 0.8 μm, and the metal impact buffer material of 1 μm or more in thickness works well. For an enough margin, it is thought that the thickness of 1.3 μm or more is more preferable for a metal impact buffer material.

With respect to acceleration sensors having impact buffer materials of each of aluminum oxide and silicon nitride, their chipping occurrence ratios were as follows. The followings are written in order of thickness of impact buffer materials and chipping occurrence ratios of aluminum oxide and silicon nitride. For 0.5 μm, 0.038% and 0.04%. For 1.0 μm, 0.019% and 0.017%. For 1.5 μm, 0.020% and 0.018%. For 2.0 μm, 0.012% and 0.015%. For 2.5 μm, 0.014% and 0.015%. The reason why the chipping occurrence ratios for 1.0 μm thick were half of those for 0.5 μm thick for aluminum oxide and silicon nitride is supposed to be a thickness effect as in the metal impact buffer materials. But, for the ceramic impact buffer materials, even when the thickness exceeded 1.0 μm, the chipping occurrence ratios were almost the same as that of 1.0 μm in thickness. It is thought that it was because the ceramic impact buffer materials chipped by impacts, although edges and corners of weight bottom surfaces did not directly collide with inner bottom plates of protection cases because of thicker impact buffer materials. When the acceleration sensors judged as chipping occurrence were disassembled and investigated, it was found that, in the acceleration sensors with the ceramic impact buffer materials of 0.5 μm in thickness, weights were chipped, and that the ceramic impact buffer materials of 1.0 or more in thickness were chipped. It is recognized from the above that a hard and brittle ceramic is not desirable for an impact buffer material.

Additionally, acceleration sensors, in which impact buffer materials of 1 μm thick were painted with diluted epoxy resin and formed on weight bottom surfaces, were manufactured, and a chipping occurrence ratio was studied in a test similar to the impact test explained in EXAMPLE 1. As a result of the test, the chipping occurrence ratio was 0%.

EXAMPLE 3

Figure 6:
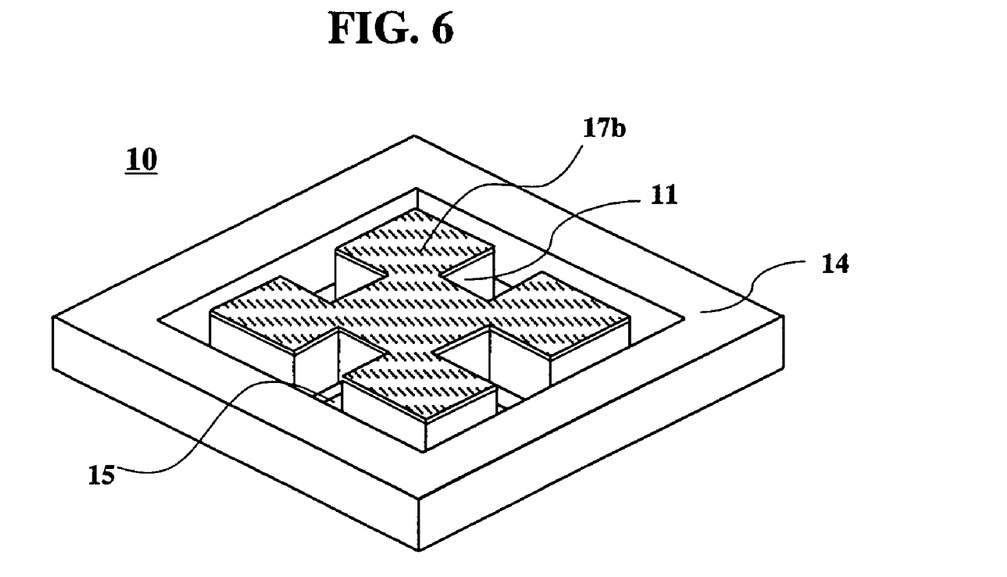
FIG. 6 is a perspective view of an acceleration sensor element used for an acceleration sensor according to another embodiment of the present invention, observed from the bottom.

An acceleration sensor element 10 according to another embodiment of the present invention, shown in a bottom perspective view of FIG. 6, has an impact buffer material 17b made of an aluminum metal layer of 1.3 μm in thickness formed on a whole bottom surface of a weight 11. In the acceleration sensor having the impact buffer material formed on the whole weight bottom surface, corners and edges of the weight bottom surface never directly clash with an inner bottom plate of a protection case, even when a distance between the inner bottom plate of the protection case and the weight bottom surface is relatively large.

EXAMPLE 4

Figure 7:
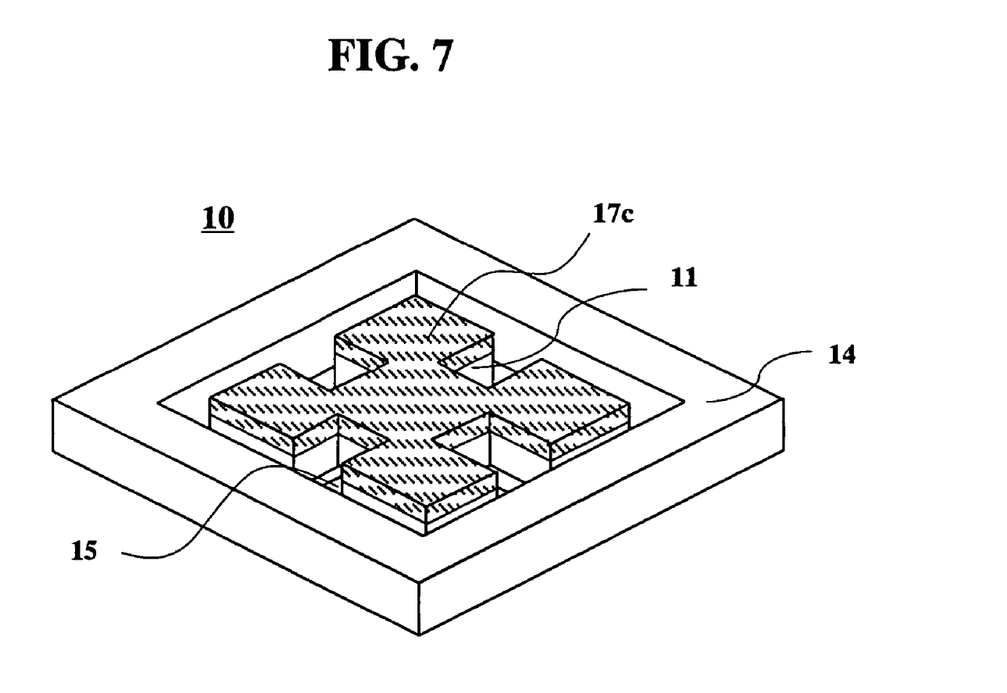
FIG. 7 is a perspective view of an acceleration sensor element used for an acceleration sensor according to still another embodiment of the present invention, observed from the bottom.

An acceleration sensor element 10 according to still another embodiment of the present invention, shown in a bottom perspective view of FIG. 7, has an impact buffer material 17c made of an aluminum metal layer of 1.0 μm thick formed to cover a whole bottom surface of a weight 11 and further extend around edges of the weight bottom surface and to side surfaces of the weight. It is apparent that, in the acceleration sensor having the impact buffer material 17c formed to extend from the weight bottom surface to the weight side surfaces, the weight bottom surface does not directly clash with an inner bottom plate of a protection case. Formation of the impact buffer material 17c, however, needs a little tact in comparison with the acceleration sensors explained in EXAMPLE 1. For example, it is necessary to mask a bottom surface of a support frame 14, after dry-etching to form a recess between the weight 11 and the support frame 14, and to sputter aluminum on a weight bottom surface in a slanting direction, during rotating an acceleration sensor element 10, to form the impact buffer material 17c extending from the weight bottom surface to the side surfaces of the weight.

EXAMPLE 5

Figure 8:
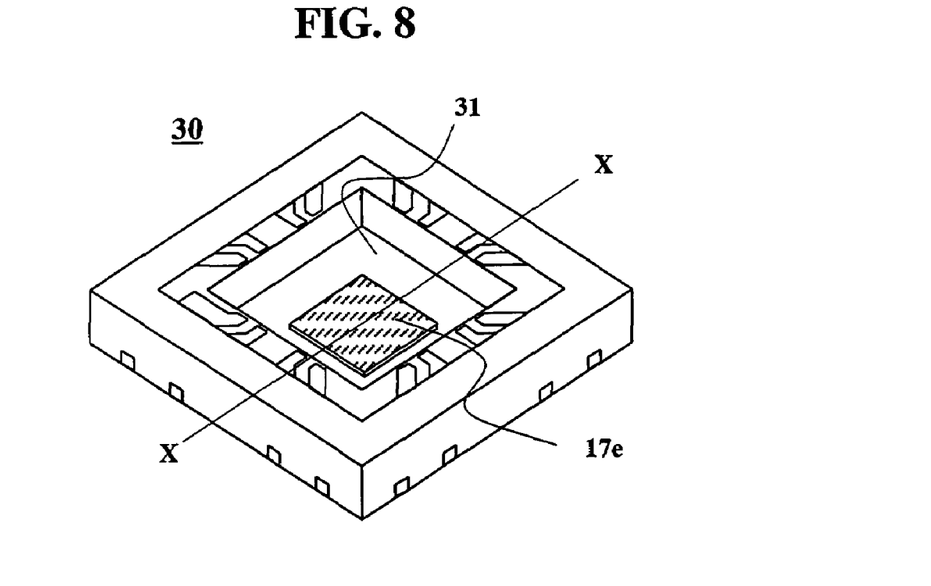
FIG. 8 is a perspective view of a protective case, without a lid, used for an acceleration sensor according to a further different embodiment of the present invention.
Figure 9:
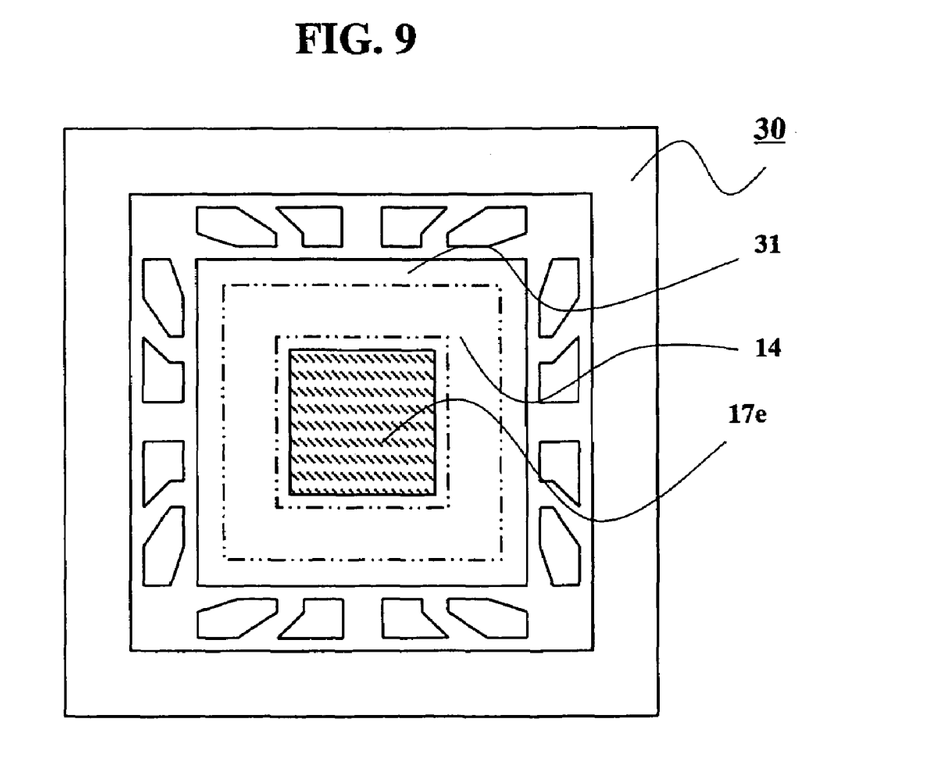
FIG. 9 is a plan view of the protective case, without a lid, shown in FIG. 8.

Here is shown a further different embodiment of an acceleration sensor, in which an impact buffer material 17e is formed on a part of an inner bottom plate 31 of a protection case 30 facing a weight bottom surface. FIG. 8 is a perspective view of the protection case 30 with a lid removed, and FIG. 9 is a plan view of the protection case 30 shown in FIG. 8. The impact buffer material 17e is formed on a part facing the weight bottom surface in a center of the inner bottom plate 31 of the protection case 30, and the area shown by double-dotted lines in FIG. 9 is a region where a support frame 14 of the acceleration sensor element is bonded. As shown in FIG.

Figure 10:
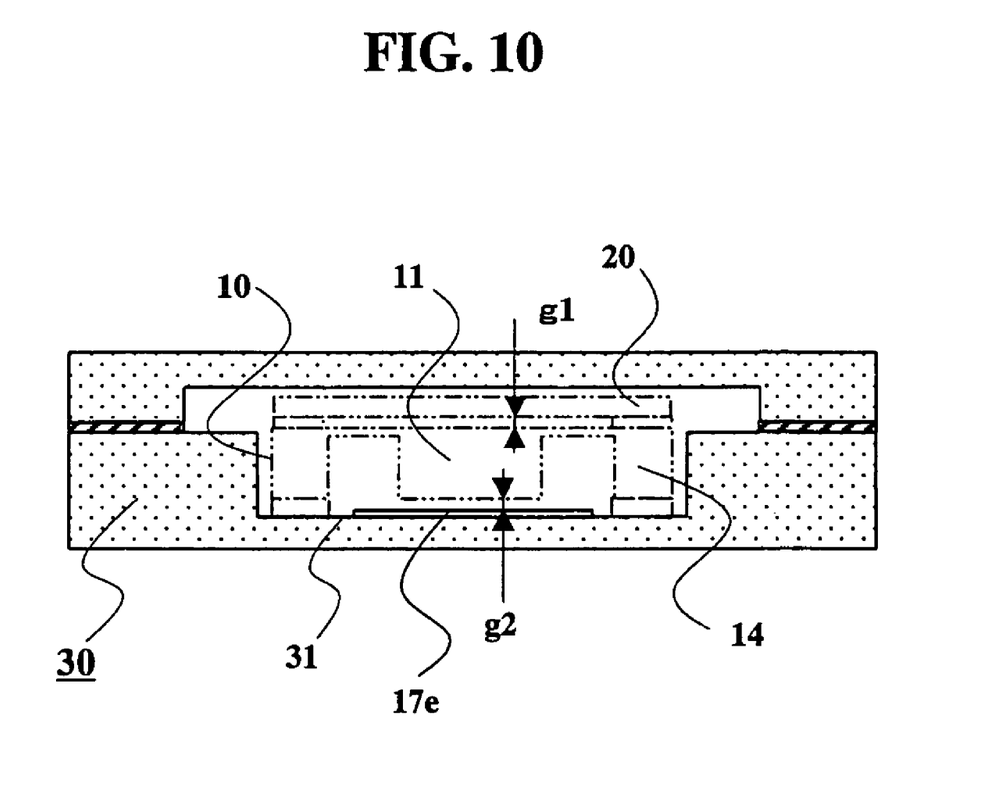
FIG. 10 is a sectional view taken along the line X-X of the protective case shown in FIG. 8.

10 that is a sectional view taken along the line X-X of FIG. 8, the impact buffer material 17*e* is formed on the inner bottom plate 31 of the protection case not to interfere with the support frame 14, and a predetermined gap g2 is made between the weight bottom surface and the impact buffer material 17*e* formed on the inner bottom plate of the protection case.

The impact buffer material 17*e* formed on the inner bottom plate of the protection case is formed to cover a part of the inner bottom plate of the protection case facing the weight bottom surface, that is, a region projected onto the inner bottom plate of the projection case from the weight bottom surface. Alternatively, an impact buffer material 17*e* covers a part of the region projected onto the inner bottom plate of the protection case from the weight bottom surface, which part is within 20 μm inside from the edges of the region, and the impact buffer material has the same effect as that formed on the whole region. Alternatively, it is understood that an impact buffer material may be formed on the inner bottom plate of the protection case to cover an area including the region projected onto the inner bottom plate of the protection case from the weight bottom surface and broader than the region. The impact buffer material may be broader than a part of the inner bottom plate of the protection case facing the weight bottom surface and extend to a bottom surface of the support frame. When the impact buffer material having such a size that it reaches the bottom surface of the support frame is used, it is desirable that the thickness of the impact buffer material is less than 5 μm so as not to develop on the support frame and elastic arms an effect of a stress due to a difference in thermal expansion coefficient between the acceleration sensor element or the protection case and the impact buffer material.

For an impact buffer material formed on the inner bottom plate of the protection case, a metal layer formed by sputtering or vapor-deposition and a resin layer bonded on the inner bottom plate may be used. It is desirable that a thick resin layer of, for example, less than 300 μm in thickness is used for an impact buffer material of a size that it does not interfere with the bottom surface of the support frame.

What is claimed is:

1. An acceleration sensor comprising:
   an acceleration sensor element having
     a weight located in a center of the acceleration sensor element,
     a support frame surrounding the weight and being at a predetermined distance from the weight,
     a plurality of elastic arms bridging an upper portion of the weight and an upper portion of the support frame and hanging the weight, and
     strain gauges formed on the elastic arms;
   a first regulation plate mounted on the acceleration sensor element with a first predetermined gap with a top surface of the weight; and
   a protection case with an inner bottom plate fixed to a bottom surface of the support frame of the acceleration sensor element, wherein said inner bottom plate has a gap between a weight bottom surface and a part of the inner bottom plate of the protection case facing the weight bottom surface;
   wherein an impact buffer material is fixed to at least one of the weight bottom surface and the part of the inner bottom plate of the protection case facing the weight bottom surface, and the other of the weight bottom surface and the part of the inner bottom plate of the protection case facing the weight bottom surface forms a second predetermined gap with the impact buffer material.

2. An acceleration sensor as set forth in claim 1, wherein the impact buffer material is fixed to only one of the weight bottom surface and the part of the inner bottom plate of the protection case facing the weight bottom surface.

3. An acceleration sensor as set forth in claim 2, wherein the impact buffer material is a metal layer of aluminum, copper, silver, gold or an alloy containing one of them as a main component, or a resin layer of fluorocarbon-series polymer, polyolefin-series resin, rubber-series material, fluoro-elastomer, fluoro-polymer or epoxy-series resin, and has a thickness of 1.0 μm or more.

4. An acceleration sensor as set forth in claim 3, wherein the impact buffer material is a metal layer formed by sputtering, vapor-deposition or plating, and having a thickness of 10 μm or less.

5. An acceleration sensor as set forth in claim 3, wherein the impact buffer material is fixed to the weight bottom surface of the acceleration sensor element so that edges of the impact buffer material are within 20 μm from an edge of the weight bottom surface.

6. An acceleration sensor as set forth in claim 5, wherein the impact buffer material is fixed to the weight bottom surface so that the edges of the impact buffer material are located at a distance of 1 μm or more and 20 μm or less from the edge of the weight bottom surface.

7. An acceleration sensor as set forth in claim 3, wherein the impact buffer material is fitted to a shape of the weight bottom surface and fixed to the weight bottom surface of the acceleration sensor element so that edges of the impact buffer material meet edges of the weight bottom surface.

8. An acceleration sensor as set forth in claim 3, wherein the impact buffer material is fixed to the weight bottom surface of the acceleration sensor element so that the impact buffer material covers the whole weight bottom surface and extends around edges of the weight bottom surface and to side surfaces of the weight.

9. An acceleration sensor as set forth in claim 3, wherein the impact buffer material covers the part of the inner bottom plate of the protection case facing the weight bottom surface and is fixed to the inner bottom plate of the protection case.

10. An acceleration sensor as set forth in claim 9, wherein the impact buffer material covers the part of the inner bottom plate of the protection case facing the weight bottom surface and is fixed to a region broader than the part.

11. An acceleration sensor as set forth in claim 3, wherein the impact buffer material is fixed to the inner bottom plate of the protection case so that edges of the impact buffer material is within 20 μm inside of edges of the part of the inner bottom plate of the protection case facing the weight bottom surface.

* * * * *